(12) United States Patent
Coy

(10) Patent No.: US 7,334,809 B2
(45) Date of Patent: Feb. 26, 2008

(54) TRAILER HITCH ASSEMBLY

(76) Inventor: Thomas Coy, 621 Allen Ave., Glendale, CA (US) 91201

( * ) Notice: Subject to any disclaimer, the term of this patent is extended or adjusted under 35 U.S.C. 154(b) by 292 days.

(21) Appl. No.: 11/022,120

(22) Filed: Dec. 24, 2004

(65) Prior Publication Data

US 2006/0170194 A1 Aug. 3, 2006

(51) Int. Cl.
*B60D 1/60* (2006.01)
(52) U.S. Cl. .............. 280/507; 280/475; 280/511; 280/767; 280/504; 180/14.1
(58) Field of Classification Search ........... 280/507, 280/475, 511, 767, 504; 180/14.1
See application file for complete search history.

(56) References Cited

U.S. PATENT DOCUMENTS

| 3,463,514 | A |   | 8/1969  | Warner              |
|-----------|---|---|---------|---------------------|
| 4,082,311 | A |   | 4/1978  | Hamman              |
| 4,774,823 | A |   | 10/1988 | Callison            |
| 5,806,871 | A | * | 9/1998  | Eggleston ..... 280/414.1 |
| 5,873,594 | A |   | 2/1999  | McCoy et al.        |
| 6,155,587 | A |   | 12/2000 | Milazzo             |
| 6,199,891 | B1|   | 3/2001  | Bell et al.         |
| 6,244,614 | B1|   | 6/2001  | Bonvillain et al.   |
| 6,382,657 | B1| * | 5/2002  | Lynn et al. ............. 280/507 |
| 6,644,071 | B2|   | 11/2003 | Gilbertson et al.   |
| 6,739,601 | B1| * | 5/2004  | Fine ..................... 280/3 |
| 2003/0038454 | A1| * | 2/2003 | Valencia ............. 280/511 |
| 2003/0042707 | A1| * | 3/2003 | McCarty .............. 280/477 |

* cited by examiner

*Primary Examiner*—Lesley D. Morris
*Assistant Examiner*—Marlon Arce-Diaz
(74) *Attorney, Agent, or Firm*—Tsircou Law, PC

(57) ABSTRACT

A trailer hitch assembly better secures a trailer to a vehicle trailer hitch. By restricting vertical travel of the trailer coupling, a hitch ball on a draw bar is better engaged by the trailer coupling as any vertical dislodgement of the trailer coupling from the hitch ball is restricted by the underlying trailer hitch assembly. The underlying trailer hitch assembly cannot travel upward when locked into position as the draw bar obstructs its upward travel, thus preventing the trailer coupling from disengaging the hitch ball. The trailer hitch assembly is lockably pivotable away from the underside of the draw bar in order to allow controlled disengagement of the trailer coupling from the hitch ball. The trailer hitch assembly may act as a support when placed in the vertical or downward position with a wheel, pad, or skid providing support for the accompanying trailer and its load. Additionally, a new trailer hitch ball system is detachably attachable to the draw bar without a shank, nut, or washer.

18 Claims, 5 Drawing Sheets

TRAILER HITCH ASSEMBLY

COPYRIGHT AUTHORIZATION

Portions of the disclosure of this patent document may contain material which is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

BACKGROUND OF THE INVENTION

1. Field of the Invention

This invention relates to trailer hitch assemblies and more particularly to a trailer hitch assembly that ensures connection and attachment between the vehicle and the trailer while also enabling conversion to a trailer stand. The trailer hitch ball delivering higher clearance by reducing the lower shank is also disclosed.

2. Description of the Related Art

As is known in the art, vehicles will often pull trailers of a variety of sizes and loads. For smaller trailers, a trailer hitch is attached to a vehicle, such as a SUV (Sports Utility Vehicle), with there being a draw bar extending horizontally rearward from the vehicle and ending in an upwardly-projecting hitch ball. The hitch ball is engaged by a trailer coupling extending forwardly and horizontally from the trailer. The coupling is then attached to the ball as by a compression fit or a controllably shrunken aperture so that the ball cannot dislodge from the coupling. This is generally effective and trailers are safely transported, towed behind vehicles across the country, through wilderness areas, etc.

However, it is a significant concern that the trailer does not come inadvertently unhitched from the vehicle during travel. Sometimes this happens as when the coupling on the trailer is not properly attached to the vehicle hitch. For example, a 1 7/8" ball may be used with a 2" coupler. Drivers can forget to lock the coupling to the ball and when the vehicle-trailer combination goes over a bumper or depression, the ball can dislodge from the coupling, freeing the trailer from the vehicle. Safety chains not withstanding, this can cause a dangerous situation as such chains may snap or, if the chains remain connected to the trailer and vehicle, cause the trailer to become unmanageable, cause it to veer, injuring the trailer and/or the trailer coupling and risking the injury of other people.

As result, it is important to safely couple a trailer to a vehicle via known means that are readily used without great inconvenience.

In U.S. Pat. No. 3,463,514 issued to Warner for a trailer hitch assembly, some basic components of a trailer hitch assembly are set forth, particularly that regarding the mounting ball for the vehicle trailer hitch.

In U.S. Pat. No. 5,873,594 issued to McCoy et al. for a notched end hitch bar, a variation of the vehicle trailer hitch is set forth enabling a redistribution of the load and adjustment of certain features.

Certain other locks, protectors, and otherwise are known in the art.

SUMMARY OF THE INVENTION

In view of the foregoing disadvantages inherent in the known types of trailer coupling security devices now present in the art, the present invention provides a new trailer hitch assembly wherein the same can be used both to secure the coupling between the vehicle and trailer as well as providing a stand for the trailer via an easy conversion of the assembly device.

The general purpose of the present invention described subsequently in greater detail, is to provide a new trailer hitch assembly that provides greater hitch security as well as providing a stand for the trailer when it is uncoupled from the vehicle. The trailer hitch assembly of the present invention has many of the advantages of the trailer hitch assemblies mentioned heretofore and otherwise previously known as well as many novel features that result in a new trailer hitch assembly which is not anticipated, rendered obvious, suggested, taught, or even implied by any of the prior art trailer hitch assemblies, either alone or in any combination thereof.

The trailer hitch assembly is set forth herein addresses one of the most common problems in the towing industry where the trailer being towed unexpectedly becomes detached from the tow vehicle. One of the reasons for such unexpected detachment is the installation or use of the wrong size ball for the coupler. This can occur when a 2" coupler is used with a ball having a diameter of 1 7/8". When towing the trailer, encountering a dip or bump may cause the trailer coupling to rise and detach from the ball. If the coupler is older or worn, the coupler may also become unlocked while towing. Human error may occur by not mounting or coupling the coupler properly which may also allow the trailer to detach from the tow vehicle.

The present invention is installed generally by welding it to the bottom of the trailer coupler generally proximate the tow bar. When engaged, the trailer hitch assembly set forth herein locks underneath a draw bar of the vehicle portion of the hitch assembly to prevent the trailer coupling from rising which consequently prevents the trailer from coming detached from the hitch ball and tow vehicle. The hitch ball is trapped between the locking mechanism present beneath the draw bar in the coupler above the draw bar. By adding the trailer hitch assembly set forth herein to a trailer, even if the coupler has the wrong size ball or even if it is accidentally left unlocked while towing, the trailer will not become detached from the ball/tow vehicle.

Once engaged, the locking rod of the hitched assembly can be padlocked to the coupler mounting bracket which also prevents theft of the trailer. When disengaged, the locking support can be locked at a 90 degree angle downward enabling it to be used as a trailer stand with an add-on wheel or an add-on pad at the bottom of the locking support.

Tow vehicles having an obstruction under the draw bar which might otherwise not allow the trailer hitch assembly set forth herein to be engaged may accommodate the obstruction by unbolting or removing the nut, spring, and locking rod enabling removal of the locking support and leaving in place the welded bracket. This disassembly enables the trailer hitch assembly to be removably detached and reattached to the coupler mounting bracket.

In some embodiments, the locking support may enable height adjustment. Also, the positioning of the assembly acts as a visual indicator as to the locked or unlocked status of the assembly. The marked visibility of the locking support's position makes it easy for one, particularly a driver making a pre-trip visual check, to determine if the assembly is in a locked and horizontal position ready for travel or in an unlocked and vertical position. Safe operation of trailers is increased as a consequence.

In another embodiment of the present invention, another problem in the tow industry is addressed. Vehicles such as motorhomes may have a long over hang over the rear axle. This over hang is generally a rearward extension of the vehicle sometimes far past the rear axle in a rearward direction. These vehicles sometimes bottom out when entering or exiting a driveway or may bottom out on the highway when encountering a dip or a bump.

When such vehicles have a trailer hitch, the ball then becomes the pivot point of the tow vehicle/trailer combination. The bottom of the ball below the draw bar where normally the nut washer and threaded shaft bar is then generally the lowest point during such articulation between the vehicle and the trailer. A standard ball used in a hitch assembly can protrude downwardly as much as 3 ½" below the draw bar and this causes a loss of ground clearance that can be very much needed once such ground clearance is absent. Sometimes owners or manufacturers attach small wheels or skids to the rear most end of such vehicles in order to address the problem.

As a result, a draw bar according the present invention may be constructed using thicker material than is normally used. This thicker material (generally steel or the like) is drilled and threaded to replace the nut which is generally at the bottom of the draw bar to secure the hitch ball into place. The diameter of the threads and the thread size used and etched into the draw bar may be enlarged to give more strength to the entire assembly. In conjunction with the threaded draw bar, a hitch ball having a threaded extension is threaded directly and downwardly into the vertical threaded hole of the draw bar. The use of an external hex configuration at the base of the hitch bar enables a wrench to tighten the ball onto the draw bar. The ball mounting surface may be undercut, as in a congruent undercut. The mounting surface of the ball would be knurled or a lock washer would be affixed to perform as a locking washer. This enables the use of a larger radius at the root of the threads for greater strength and connection between the hitch ball and the draw bar. With the inventive designs set forth herein, a nut, washer, and/or long threaded shaft generally used with the standard hitch ball are not needed.

There are several embodiments of the system(s) and/or assembly(ies) set forth herein.

In one embodiment, a trailer hitch assembly has a coupler mounting bracket adapted to be operatively coupled to a trailer coupling with a locking support pivotably coupled to the coupler mounting bracket. A ground-engaging support couples to the locking support such that the locking support is pivotable to a first lock position and a second support position.

In another embodiment, a trailer hitch assembly has a coupler mounting bracket adapted to be operatively coupled to a trailer coupling and has first and second side panels. The first side panel has a forward hole, a rearward hole, and an upper hole. The rearward and upper holes are generally disposed at right angles to each other with respect to the forward hole. A locking support pivotably couples to the coupler mounting bracket. The locking support has a proximal end, a circumscribing extension, and a distal end, the proximal end pivotably couplable to the coupler mounting bracket. The circumscribing extension projects away from the proximal end with the circumscribing extension defining an aperture. The distal end extends from to the circumscribing extension and is generally oppositely opposed to the proximal end such that the proximal end, the circumscribing extension, and the distal end are generally co-linear. The distal end is adapted for coupling with the ground-engaging support.

The proximal end has a generally central pivot axis and a rearward locking aperture. The pivot axis is generally adjacent the aperture and is generally perpendicular to an axis defined by the co-linear proximal end, circumscribing extension, and the distal end. The rearward locking aperture is generally adjacent an end of the proximal end opposite that of the aperture with respect to the pivot axis.

The pivot axis is generally defined by structures selected from the group consisting of: channels traveling from one side of the locking support to an opposite side, channels established by a cross member, a pair of co-axial holes, and/or a combination thereof. The locking support is generally constructed from material configurations selected from the group consisting of: solid stamped metal, sheet stamped metal, forged metal, appropriately configured bar metal, appropriately configured bar metal with a cross member co-axial with the pivot axis, and/or a combination thereof.

A locking rod engages the forward and rearward holes of the coupler mounting bracket to lock the locking support in a first lock position and engages the forward and upper holes to lock the locking support in a second support position. The locking rod has a central extended post passing through the forward hole and the locking support. A cross member couples to the central extended post. A locking arm couples to the cross member. The locking arm is generally parallel to the central extended post and passes through the rearward hole and the locking support to lock the locking support in the first lock position and passes through the upper hole and the locking support to lock the locking support in the second support position. The locking support generally pivots upon the central extended post.

The coupler mounting bracket has a spring coupled to the pivotable locking rod which biases the pivotable locking rod in a locked position to maintain the locking support in either the first lock position or the second support position. The bias of the spring may generally be overcome by directed manual engagement to enable the locking support to change from the first lock position to the second support position and vice-versa. The coupler mounting bracket also has a nut coupled to an end of the pivotable locking rod with the spring entrapped between the nut and the second side panel.

A ground-engaging support couples to the locking support. The ground-engaging support selected from the group consisting of wheels, pads, plates, supports, and/or a combination thereof. Overall, the locking support is pivotable to the first lock position and the second support position.

In a third embodiment, a trailer hitch assembly has a base plate with a threaded aperture and a ball member that has a threaded shank threadedly secured therein. The ball member is adapted to be received within the socket of a trailer hitch.

In a fourth embodiment, a trailer hitch locking assembly has a base plate with a threaded aperture and a ball member with a threaded shank threadedly secured therein. The ball member is adapted to be received within the socket of a trailer hitch. The ball member has an extending flanged collar intermediate its ends. The underside surface of the flanged collar is undercut congruently about the diameter of the threaded shank and the top of the ball member is flat.

In a fifth embodiment, in a trailer hitch assembly including a draw bar and ball component, the improvement is set forth that has a threaded aperture in the draw bar and the ball component with a threaded shank for threaded engagement with the threaded aperture.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
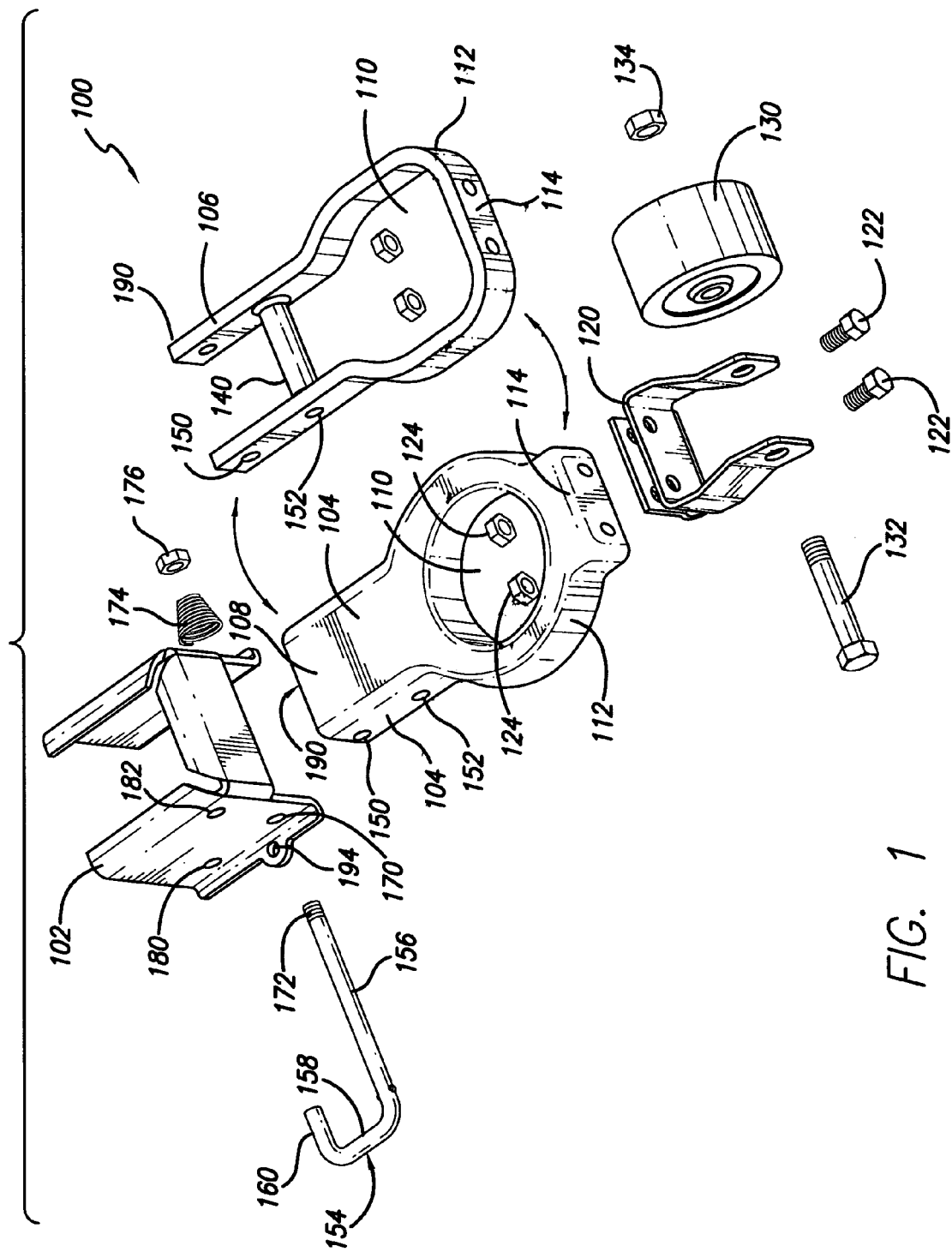
FIG. 1 is a right front perspective and exploded view of the trailer hitch assembly system of the present invention showing alternative embodiments for the locking support as indicated by the double headed arrows towards the center of the drawing.

Referring to the drawing where like numerals of reference designate like elements throughout, it will be noted that in FIG. 1, a right side perspective and exploded view of the trailer hitch assembly of the present invention is shown with an indication of alternative embodiments in the locking support component.

Figure 3:
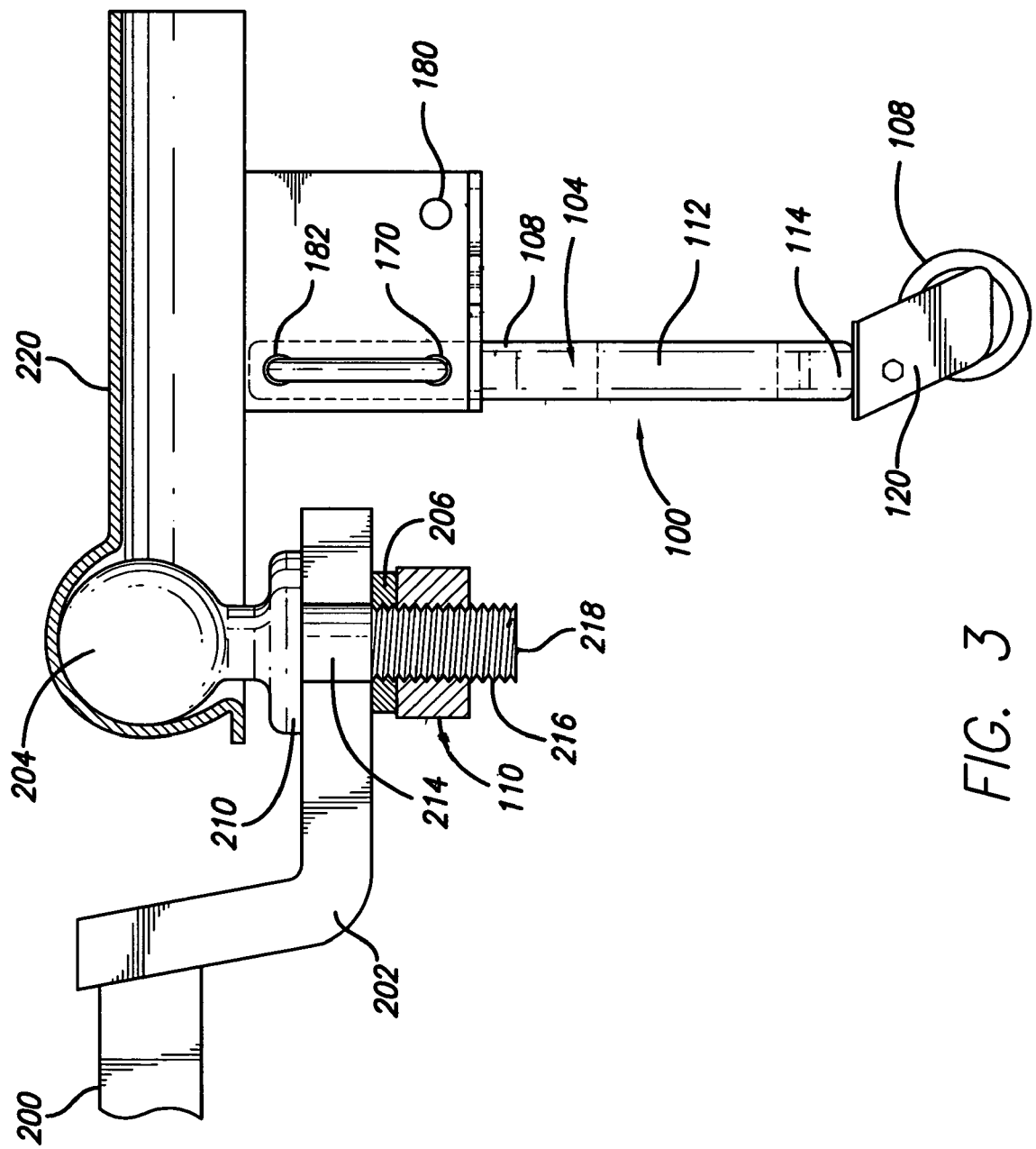
FIG. 3 is a right side and partial cross sectional view of a trailer hitch coupling implementing the trailer hitch assembly of the present invention showing the trailer hitch assembly in a vertical trailer stand configuration. Note should be taken that the locking rod is configured on the opposite side of the coupler mounting bracket than that shown in FIGS. 1 and 2.
Figure 4:
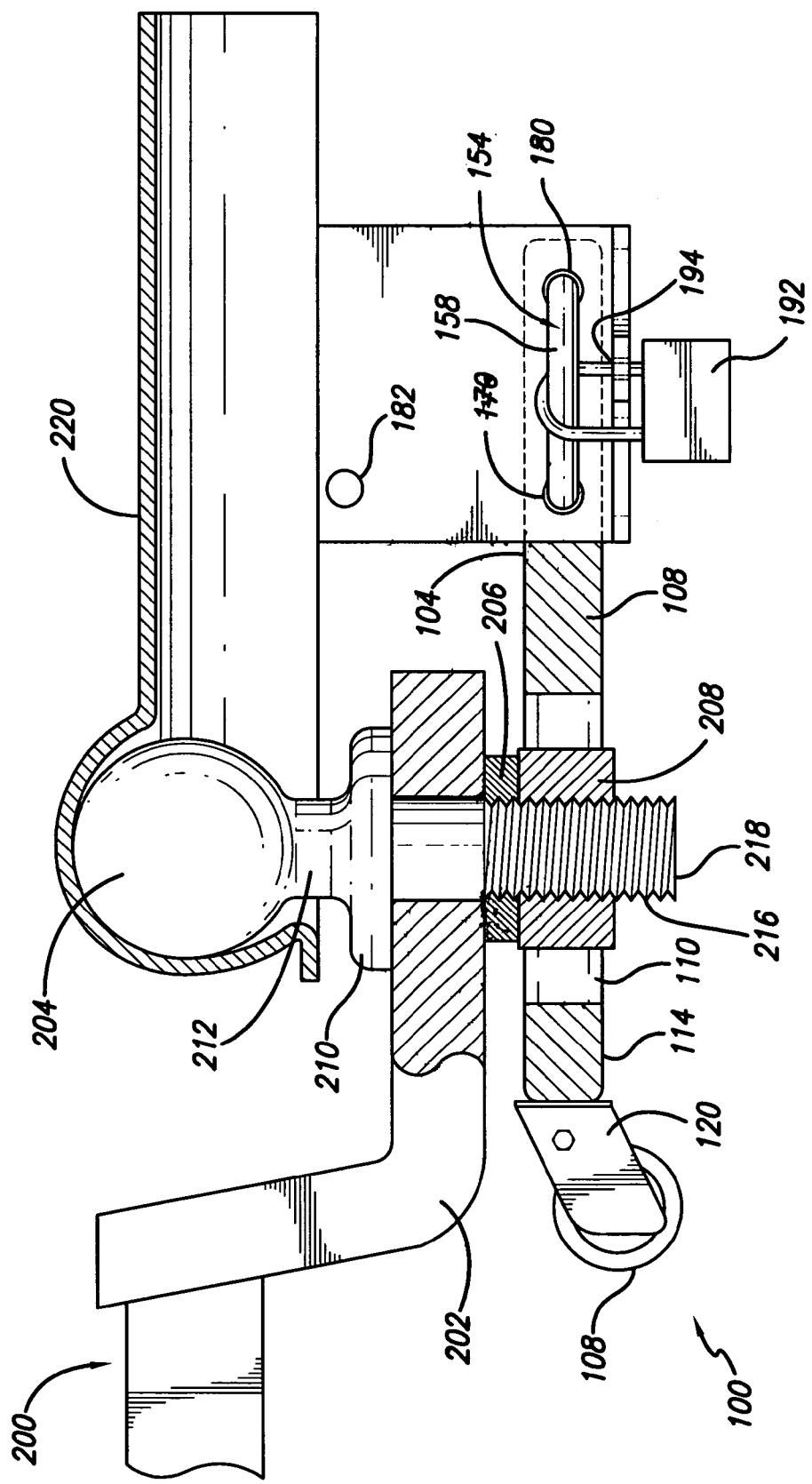
FIG. 4 is a left side partial cross sectional view of the trailer hitch coupling and trailer hitch assembly as shown in FIG. 3 with a trailer hitch assembly of the present invention shown in a horizontal or upward position.

In FIG. 1, the trailer hitch assembly 100 of the present invention has a coupler mounting bracket 102 that may be attached as by welding to the underside of a trailer coupler as shown in FIGS. 3 and 4. The coupler mounting bracket 102 may be attached as by welding, bolting, or other means of fixed or detachable attachment such that the coupler mounting bracket does not become detached through use despite the vigorous articulation or rough roads over which a vehicle and trailer assembly may travel.

Figure 2:
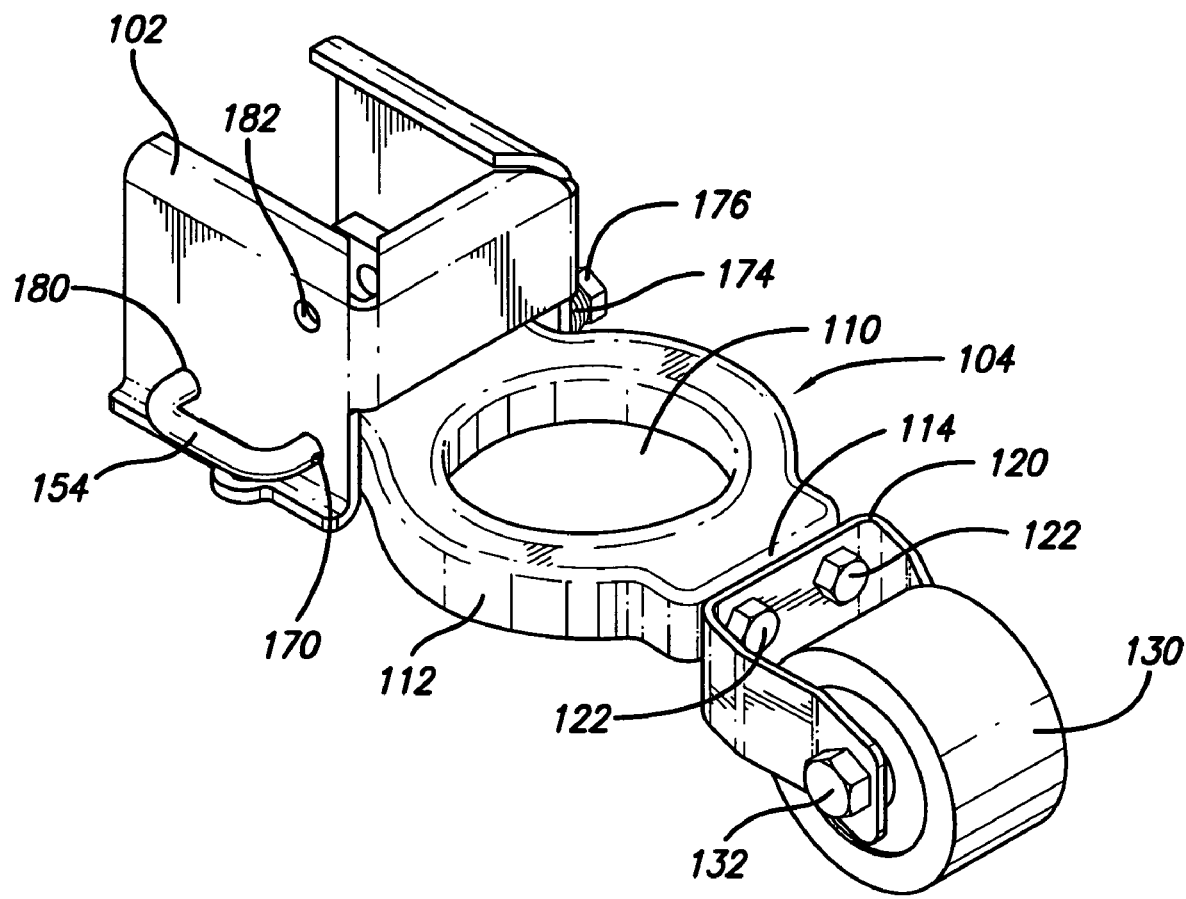
FIG. 2 is a right front perspective view of the trailer hitch assembly as shown in FIG. 1 using the left locking support, the trailer hitch assembly shown in assembled form.

Locking supports 104, 106 are shown and may be substituted one for the other, although only a single one is used in order to achieve the trailer hitch assembly in the present invention as indicated by FIG. 2. Similar reference numbers refer to similar structures with respect to the locking supports 104, 106. Beginning with the locking support 104 shown on the left side of FIG. 1, a post or stem portion 108 leads to a circumferentially defined opening 110 that is defined by the surrounding supportive structure 112. The end 114 opposite the post 108 serves as an attachment point for a wheel bracket 120 which may be attached to the attachment end 114 of the locking support 104, 106 by bolts 122, nuts 124, or other attachments means of sufficient integrity to withstand on the operating conditions of the trailer hitch assembly and trailer coupling.

A wheel 130 may then be attached to the wheel bracket 120 as by a bolt 132 and nut 134, pin, rod, or other structure so that the wheel 130 may freely turn in its attachment to the wheel bracket 120.

Generally, the wheel 130 is not meant for use to enable any attached trailer to travel long distances, but should be able to withstand significant travel distances (as by moving the trailer by hand) without suffering great wear and tear.

The left locking support 104 shown in FIG. 1 may be configured or manufactured of stamped metal or otherwise. Such stamped metal may make use of a stamped metal locking support preferred as it is easy to manufacture while possibly reducing cost.

Alternatively, the right locking support 106 can be used with its general U-shaped configuration with the cross bar 140 providing lateral support that may be inherently present in the post 108 of the left locking support embodiment 104. Generally, the opening 110 of the right locking support 106 is of similar proportion to that of the left embodiment 104, as shown in FIG. 1. As such, the inner diameters for each opening 110 may be identical. However, manufacturing constraints may cause individual embodiments of the right locking support 106 to have a larger or smaller opening 110.

Both the left locking support 104 and right locking support 106 have a series of holes about their perimeter. The rear holes 150, 152 may serve as means by which the rotating pin or locking rod 154 may engage both the locking supports 104, 106 and the coupler mounting bracket 102. More about the operation of the locking pin is set forth below. Alternative embodiments of the locking supports 104, 106 may enable them to have adjustable lengths.

The locking rod 154 has a central extended post 156 coupled to a cross member 158 and terminating in a locking arm 160 that generally gives the locking rod 154 a "J" shape. The locking rod 154 passes through a forward hole 170 present in the coupler mounting bracket 102. The central extended post 156 passes through the forward coupler mounting bracket hole 170 and through to a corresponding hole on the other side. The distal end 172 of the central extended post 156 may be coupled to a spring 174 and a nut 176. The central extended post 156 is free to turn within the coupler mounting bracket 102 and the two forward and aligned holes 170 thereof. The spring 174 biases the locking rod 154 towards the coupler mounting bracket 102 as the spring 174 is trapped between the nut 176 and a side of coupler mounting bracket 102. The nut 176 is attached to the distal end 172 of the locking rod 154 and pulls it into the forward aligned holes 170 of the coupler mounting bracket 102.

The spring 174 is generally of strength sufficient to surely and safely bias the locking rod 154 into the coupler mounting bracket. Yet, the biasing and/or urging force of the spring 170 may be overcome by manual engagement of, generally, an adult in order to rotate the locking rod 154 with respect to the coupler mounting bracket 102.

Generally, the locking rod 154 is positioned in one of two configurations with respect to the coupler mounting bracket 102. In the first configuration, the locking arm 160 is passed or travels through a rear hole 180 in the coupler mounting bracket 102. In a second and other configuration, the locking arm 160 is passed through an upper hole 182 in the coupler mounting bracket 102. As is set forth in more detail immediately below, when the locking arm 160 is in the rear hole 180, the trailer hitch assembly is generally in an upper or traveling position as shown in FIGS. 2 and 4. When the locking arm 160 is in the upper hole 182, the trailer hitch assembly is in its downward or stationary position as shown in FIG. 3.

The foregoing configurations are achieved as the central extended post 156 of the locking rod 154 generally passes through the forward pairs of rear holes 152 of the left locking support 104, right locking support 106, or equivalents thereto. As such, it can be seen that the forward rear holes 152 must pass completely through the associated locking support 104, 106 in order that the distal end 172 of a locking rod 154 can pass through the other end of a coupler mounting bracket 102 to engage the nut 176 and spring 174. As a result, the locking support 104, 106 rotatably pivots about the locking rod 154 at its central extended post 156.

The opening 110 of a locking support 104, 106 is then rotatably disposed in either an upper or lower position. The proximal end 190 of a locking support 104, 106 may be in a horizontal position when the locking arm 160 passes through the rear hole 180 of the coupler mounting bracket 102 to engage the rearward rear hole 150 of the locking support 104, 106. The locking support 104, 106 is then in a vertical position when the locking arm 160 passes through the upper hole 182 of the coupler mounting bracket 102 to engage the rearward rear hole 150 of the locking support 104, 106.

When the locking arm 160 engages the locking support 104, 106, the locking arm 160 secures the locking support in its position. The biasing of the spring 174 upon the locking rod 154 holds the locking arm 160 in place and prevents the locking support 104, 106 from rotating out of its locked position. Only when the locking arm 160 is disengaged from the locking support 104, 106 is the locking support 104, 106 able to articulate and pivot about the axis defined by the central extended post 156 of the locking rod 154.

FIGS. 2 through 4 show the trailer hitch assembly 100 of the present invention in its assembled form. FIGS. 2 and 4 show the trailer hitch assembly 100 in a horizontal or upward and traveling position. In FIG. 4, a lock 192 such as a padlock, is used to lock the cross member 158 of the locking rod 154 into position so that it cannot be disengaged from a coupler mounting bracket 102. A lock hole 194 is present on the coupler mounting bracket 102 in order to provide a secure mount for the lock 192.

As shown in FIG. 4, a vehicle trailer hitch 200 has a draw bar 202 to which a hitch ball 204 is connected by means of a washer 206 and a nut 208. The hitch ball has an extending flange or base 210 below a stem 212. The ball 204 sits above the stem and the stem may progress into a shank 214 which is threaded with threads 216 at its far end 218. The washer 206 is trapped between the nut 208 and the draw bar 202. The nut 208 is tightened sufficiently to ensure that the hitch ball 204 does not detach from the draw bar 202 and that the hitch ball 204 safely engages the trailer coupling 220.

In FIG. 4, the locking support 104 is locked by locking rod 154 in an upward horizontal position such that the opening or aperture 110 circumscribes the shank 214 as well as the washer 206 and nut 208. Lock 192 secures the locking rod 154 in place. When so disposed, the trailer hitch assembly 100 entraps the hitch ball 204 and draw bar 202 between the trailer coupling 220 and the trailer hitch assembly 100. Any upward travel of the trailer coupling 220 that might free it from the hitch ball 204 is prevented by the trailer hitch assembly 100 as it will come into contact with the bottom of the trailer hitch draw bar 202 prior to disengagement of the trailer coupling 220 from the hitch ball 204. As a result, the hitch ball 204 is entrapped between the trailer coupling 220 and the trailer hitch assembly 100 and cannot be freed therefrom until the lock 192 is unlocked, removed from its mounting hole 194 and the locking support 104 is rotating to a vertical or standing position as shown in FIG. 3. The vertical or standing position, as set forth above, is achieved by removing the locking arm 160 from the rear hole 180 of the coupler mounting bracket 102 and rotating the locking support 104 until the locking arm 160 can pass through the upper hole 182 with coupler mounting bracket 102.

As shown in FIG. 1, the central extended post 156 is round and the locking support 104, 106 may pivot freely about it. For the purposes of rotational engagement, it may be advantageous to couple the rotational motion of the locking support 104 to the rotational motion of the locking rod 154. As an example, this may be achieved in dismantlable and/or removably attachable fashion by providing a central extending locking post 156 that is round in nature and that slidably fits into a round forward hole 152 of the corresponding locking support 104, 106. In this way, the flat surfaces and corner edges of both the central extended locking pin 156 and the forward hole 152 of the locking support 104, 106 prevent relative motion of the locking post 156 rotationally about the axis of the post 156 with respect to hole 152 but enable slidable travel between the two along the axis to occur. In this way, the locking arm 160 may always be aligned with the rear hole 150 of the locking support 104, 106 when the locking arm 160 is aligned with either the rear hole 180 or upper hole 182 of the coupler mounting bracket 102.

As shown in FIG. 3, when the trailer hitch assembly 100 is placed a vertical position, it may be locked into place by the locking arm 160 and the trailer coupling 220 may be removed from the hitch ball 204 by the lifting of the trailer coupling 220 and displacement of the trailer coupling with respect to the hitch ball 204. Generally, although trailers might be heavy, they are usually balanced upon their axles. As a result, there may be little or no torque on the trailer coupling 220 that would prevent it from being easily lifted off of the hitch ball 204. Preferably, the load on the trailer is somewhat biased towards the trailer coupling 220 so that it has a tendency to bear weight upon the trailer hitch assembly 100 when in the vertical standing configuration of FIG. 3. This prevents the load and/or trailer from tipping backwards and it enables the trailer hitch assembly 100 to form a support for the trailer as a whole.

Note should be taken that FIGS. 1-4 that a wheel 130 is used as the support for the trailer hitch assembly 100 when shown in the vertical standing position of FIG. 3. However, a non-rotating or non-turning pad may also be used as may a skid plate or other alternative support structure.

Figure 5:
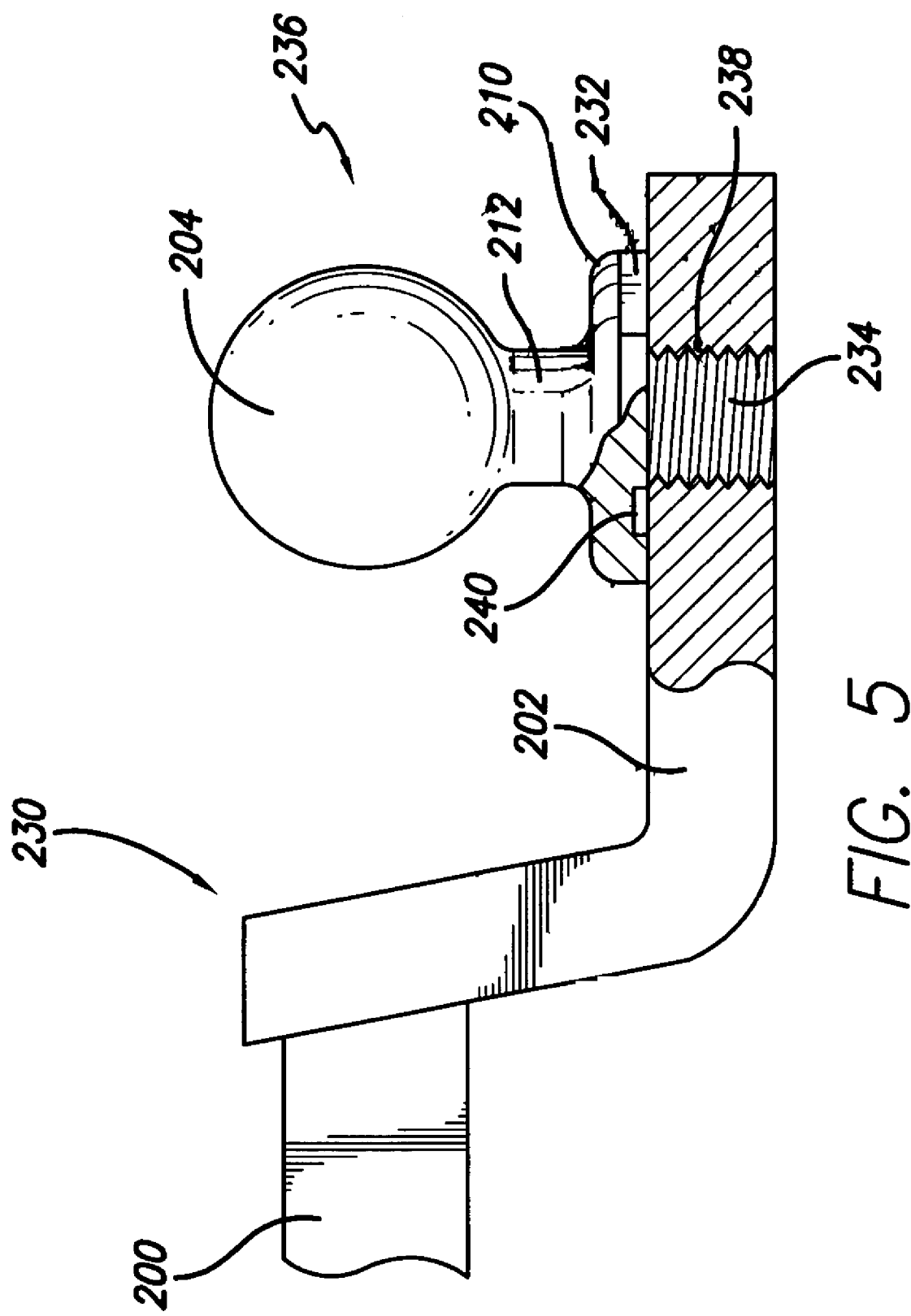
FIG. 5 is a left side and partial cross sectional elevational view of a trailer hitch mount according to the present invention that may be substituted for that shown in FIGS. 3 and 4, the mounting ball being threaded into the draw bar.

In FIG. 5, an alternative vehicle trailer hitch 230 is shown without a washer and nut. The hitch ball 204 has a stem 212 that transitions into a hexagonal base 232. The shank 234 of the hitch ball assembly 236 is threaded as is the hole of the draw bar 202 into which it threadably attaches. By means of a hex base 232, a wrench or other tool may be used to apply torque on the hitch ball 236 at its base 232 and secure it into the threadable aperture 238 of the draw bar 202. By appropriate dimensioning and sizing of the shank 234 and threaded aperture 238 as well as the disposition, positioning, and depth of the threads, a secure vehicle trailer hitch 230 can be constructed.

This alternative vehicle trailer hitch 230 may be enhanced by significant augmenting of the thickness, weight, and/or strength of the draw bar 202. The vehicle trailer hitch 230 of FIG. 5 may be substituted that for the vehicle trailer hitch 200 of FIGS. 3 and 4. In that case, although the distal end 218 of the shank 214 generally prevents lateral travel due to limits of the opening 110, the vertical restriction (with respect to the trailer coupling 220 as indicated in FIG. 4) still occurs despite the freedom of the trailer hitch assembly 110 to travel unrestrained by any shank 214, nut 208, and/or washer 206. For such configurations, a solid locking support 104, 106 might be used which would otherwise be unavailable when a descending shank or other protrusion is present that projects downwardly from the draw bar 202.

The ball mounting surface adjacent the draw bar 202 may be undercut, as in a congruent undercut 240. The mounting surface of the ball would be knurled or a lock washer would be affixed to perform as a locking washer. This enables the use of a larger radius at the root of the threads for greater strength and connection between the hitch ball and the draw bar. With this construction, a nut, washer, and/or long threaded shaft generally used with the standard hitch ball are not needed.

While the present invention has been described with regards to particular embodiments, it is recognized that additional variations of the present invention may be devised without departing from the inventive concept thereof and as disclosed herein.

What is claimed is:

1. A trailer hitch assembly, comprising:
   a coupler mounting bracket adapted to be operatively coupled to a trailer coupling;
   a locking support pivotably coupled to said coupler mounting bracket; and
   a ground-engaging support coupled to said locking support; whereby said locking support is pivotable to a first lock position and a second support position, such that in said first lock position said locking support is secured in place projecting forwardly relative to said coupler mounting bracket and below said trailer coupling to entrap a hitch ball therebetween and such that in said second support position said locking support is oriented to enable said ground-engaging support to contact said ground with said trailer coupling detached from said hitch ball.

2. A trailer hitch assembly as set forth in claim 1, wherein said coupler mounting bracket further comprises:
   first and second side panels coupled to said locking support by a pivotable locking rod;
   said first side panel having a forward hole, a rearward hole, and an upper hole, said rearward and upper holes generally disposed at right angles to each other with respect to said forward hole;
   said locking rod engaging said forward and rearward holes to lock said locking support in said first lock position and engaging said forward and upper holes to lock said locking support in said second support position.

3. A trailer hitch assembly as set forth in claim 2, wherein said locking rod further comprises:
   a central extended post passing through said forward hole and said locking support;
   a cross member coupled to said central extended post; and
   a locking arm coupled to said cross member, said locking arm passing trough said rearward hole and said locking support to lock said locking support in said first lock position and passing through said upper hole and said locking support to lock said locking support in said second support position, said locking support generally pivoting upon said central extended post.

4. A trailer hitch assembly as set forth in claim 2, wherein said coupler mounting bracket further comprises:
   a biasing member coupled to said pivotable locking rod and biasing said pivotable locking rod in a locked position to maintain said locking support in either said first lock position or said second support position, bias of said biasing member generally overcome by directed manual engagement to enable said locking support to change from said first lock position to said second support position and vice-versa.

5. A trailer hitch assembly as set forth in claim 4, wherein said coupler mounting bracket flitter comprises:
   a nut coupled to an end of said pivotable locking rod; and
   said biasing member being a spring and being entrapped between said nut and said second side panel.

6. A trailer hitch assembly as set forth in claim 1, wherein said locking support further comprises:
   a proximal end pivotably couplable to said coupler mounting bracket;
   a circumscribing extension projecting away from said proximal end, said circumscribing extension defining an aperture; and
   a distal end coupled to said circumscribing extension and generally oppositely opposed to said proximal end such that said proximal end, said circumscribing extension, and said distal end are generally co-linear, said distal end adapted for coupling with said ground-engaging support.

7. A trailer hitch assembly as set forth in claim 6, wherein said locking support further comprises:
   said proximal end having a generally central pivot axis generally adjacent said aperture, said pivot axis generally perpendicular to an axis defined by said co-linear proximal end, circumscribing extension, and said distal end;
   said proximal end having a rearward locking aperture generally adjacent an end of said proximal end opposite that of said aperture with respect to said pivot axis.

8. A trailer hitch assembly as set forth in claim 7, wherein said locking support further comprises:
   said pivot axis defined by structures selected from the group consisting of: channels traveling from one side of said locking support to an opposite side, channels established by a cross member, a pair of co-axial holes, and/or a combination thereof.

9. A trailer hitch assembly as set forth in claim 7, wherein said locking support further comprises:
   said locking support constructed from material configurations selected from the group consisting of: solid stamped metal, sheet stamped metal, forged metal, appropriately configured bar metal, appropriately configured bar metal with a cross member co-axial with said pivot axis, and/or a combination thereof.

10. A trailer hitch assembly as set forth in claim 1, wherein said ground-engaging support further comprises:
    a ground-engaging support selected from the group consisting of wheels, pads, plates, supports, and/or a combination thereof.

11. A trailer hitch assembly, comprising:
    a coupler mounting bracket adapted to be operatively coupled to a trailer coupling and having first and second side panels;
    said first side panel having a forward hole, a rearward hole, and an upper hole, said rearward and upper holes generally disposed at right angles to each other with respect to said forward hole;
    a locking support pivotably coupled to said coupler mounting bracket, said locking support having a proximal end, a circumscribing extension, and a distal end, said proximal end pivotably couplable to said coupler mounting bracket, said circumscribing extension projecting away from said proximal end, said circumscribing extension defining an aperture, and said distal end coupled to said circumscribing extension and generally oppositely opposed to said proximal end such that said proximal end, said circumscribing extension, and said distal end are generally co-linear, said distal end adapted for coupling with said ground-engaging support;
    said proximal end having a generally central pivot axis and a rearward locking aperture, said pivot axis generally adjacent said aperture and generally perpendicular to an axis defined by said co-linear proximal end, circumscribing extension, and said distal end, and said rearward locking aperture generally adjacent an end of said proximal end opposite that of said aperture with respect to said pivot axis;
    said pivot axis generally defined by structures selected from the group consisting of: channels traveling from one side of said locking support to an opposite side, channels established by a cross member, a pair of co-axial holes, and/or a combination thereof;

said locking support constructed from material configurations selected from the group consisting of: solid stamped metal, sheet stamped metal, forged metal, appropriately configured bar metal, appropriately configured bar metal with a cross member co-axial with said pivot axis, and/or a combination thereof; a locking rod engaging said forward and rearward holes of said coupler mounting bracket to lock said locking support in a first lock position and engaging said forward and upper holes to lock said locking support in a second support position;

said locking rod having a central extended post passing through said forward hole and said locking support, a cross member coupled to said central extended post, and a locking arm coupled to said cross member, said locking arm being generally parallel to said central extended post and passing through said rearward hole and said locking support to lock said locking support in said first lock position and passing through said upper hole and said locking support to lock said locking support in said second support position, said locking support generally pivoting upon said central extended post;

said coupler mounting bracket having a spring coupled to said pivotable locking rod and biasing said pivotable locking rod in a locked position to maintain said locking support in either said first lock position or said second support position, bias of said spring generally overcome by directed manual engagement to enable said locking support to change from said first lock position to said second support position and vice-versa;

said coupler mounting bracket further having a nut coupled to an end of said pivotable locking rod with said spring entrapped between said nut and said second side panel;

a ground-engaging support coupled to said locking support, said ground-engaging support selected from the group consisting of wheels, pads, plates, supports, and/or a combination thereof;

whereby said locking support is pivotable to said first lock position and said second support position.

12. A trailer hitch assembly, comprising:

a coupler mount adapted to be operatively coupled to a trailer coupling, said coupler mount defining a first hole and a second hole;

a locking support pivotably coupled to said coupler mount;

a ground-engaging support coupled to said locking support a locking rod configured to pivotably couple locking support to said coupler mount; said locking rod configured to engage said first hole to maintain said locking support in a first lock position and to engage said second hole to maintain said locking support in a second support position, such that in said first lock position said locking support projects forwardly relative to said coupler mounting bracket below said trailer coupling to entrap a hitch ball therebetween and such that in said second support position said locking support is oriented to enable said ground-engaging support to contact said ground with said trailer coupling detached from said hitch ball.

13. A trailer hitch assembly as set forth in claim 12, wherein said ground-engaging support is selected from the group consisting of wheels, pads, plates, supports, and/or a combination thereof.

14. A trailer hitch assembly as set forth in claim 12, wherein said locking support includes
a proximal end pivotably coupled to said coupler mount; and
a circumscribing extension projecting away from said proximal end, said circumscribing extension defining an aperture sized to receive a nut used to secure said hitch ball in place.

15. A trailer hitch assembly as set fort in claim 12, wherein said locking rod further comprises:
a central extended post passing through said coupling mount and said locking support;
a cross member coupled to said central extended post; and
a locking arm coupled to said cross member, said locking arm configured to selectively engage said first hole and said second hole.

16. A trailer hitch assembly as set forth in claim 12, wherein said locking support further comprises:
a proximal end pivotably couplable to said coupler mounting bracket;
a circumscribing extension projecting away from said proximal end, said circumscribing extension defining an aperture; and
a distal end coupled to said circumscribing extension and generally oppositely opposed to said proximal end such that said proximal end, said circumscribing extension, and said distal end are generally co-linear, said distal end adapted for coupling with said ground-engaging support.

17. A trailer hitch assembly as set forth in claim 16, wherein said locking support further comprises:
said proximal end having a generally central pivot axis generally adjacent said aperture, said pivot axis generally perpendicular to an axis defined by said co-linear proximal end, circumscribing extension, and said distal end;
said proximal end having a rearward locking aperture generally adjacent an end of said proximal end opposite that of said aperture with respect to said pivot axis.

18. A trailer hitch assembly as set forth in claim 16, wherein said aperture of said circumscribing extension is sized to receive a shank of said hitch ball.

* * * * *